3,563,707
PROCESS FOR PURIFYING YELLOW
PHOSPHORUS
Fritz Krahl, Hermulheim, near Cologne, Gero Heymer,
Knapsack, near Cologne, and Heinz Harnisch, Love-
nich, near Cologne, Germany, assignors to Knapsack
Aktiengesellschaft, Knapsack, near Cologne, Germany,
a corporation of Germany
No Drawing. Filed July 12, 1968, Ser. No. 744,318
Claims priority, application Germany, July 22, 1967,
K 62,908
Int. Cl. C01b 25/04
U.S. Cl. 23—223                                    8 Claims

ABSTRACT OF THE DISCLOSURE

Process for purifying yellow phosphorus, particularly for reducing its content of arsenic and/or organic contaminants, comprising treating the phosphorus with sulfuryl chloride with thorough mixing at temperatures between the phosphorus fusion point and 150° C., preferably between 70 and 100° C.

---

The present invention relates to a process for purifying yellow phosphorus and more particularly for reducing its content of arsenic and/or organic contaminants.

Elemental yellow phosphorus, which is produced from crude phosphate by electrothermal means, is generally found to contain arsenic and/or organic contaminants in proportions varying within certain limits. These are undesirable because they are often found considerably to restrict the uses of secondary phosphorus products, e.g. phosphoric acid salts, which are obtained on subjecting the phosphorus to finishing treatment. The above organic contaminants include, for example, hydrocarbons and phenols.

It has already been reported that phosphorus compounds substantially free from arsenic can be produced given that thermal phosphoric acid is the feed material, which is preferred today in commercial operations. Prior to finishing it, this acid is treated by means of alkali metal sulfides to precipitate the arsenic as arsenic sulfide. No such possibility does exist in processes, wherein the phosphorus compounds are produced directly from elemental phosphorus while omitting the intermediary phosphoric acid stage, for example in the processes described in German Patents 1,112,053 and 1,159,403, respectively, for the production of alkali metal phosphates and polyphosphoric acid from elemental phosphorus.

Various processes for the purification of yellow phosphorus have already been described.

For example, phosphorus containing less than 0.005% of inorganic contaminants and less than 0.1% of organic contaminants is obtained in those cases in which the phosphorus is subjected to polyphosphoric acid treatment combined with bleaching earth or active carbon.

It is also known that phosphorus can be purified by treatment with concentrated sulfuric acid or dilute chromosulfuric acid as well as by extraction with organic halogen compounds.

All of these earlier processes, however, have a considerable disadvantage which resides in the fact that the arsenic contained in the phosphorus cannot be isolated therefrom or can be isolated to an extremely minor extent only. It has furthermore been found in the treatment of yellow phosphorus by means of dilute chromosulfuric acid that this acid becomes reduced very rapidly and produces but a slight purification effect. Difficulties are also encountered in the purification of phosphorus by means of concentrated sulfuric acid. For example, the relatively slight density difference with respect to phosphorus may be found to entail separation difficulties bearing in mind that the density difference is even further reduced by the purification step and the water contained in the phosphorus. The treatment with polyphosphoric acid enables the phosphorus to be freed substantially from all inorganic contaminants, except arsenic, but this step awaits combination later with filtration over active carbon and bleaching earth to provide for efficient isolation of organic material.

Apart from the above processes, it has been proposed to free phosphorus from the arsenic contained therein, more particularly by subjecting the phosphorus to distillation with the help of a gas inert with respect to phosphorus. To this end, the gas, which is maintained under a pressure between 20 and 400 mm. and at a temperature above the phosphorus fusion point but below the conversion point of yellow phosphorus into red phosphorus, is passed through the phosphorus and the resulting mixture consisting of phosphorus in vapor form and inert gas is subjected to fractional condensation.

The distillation processes, however, are found to combine high energy costs with the formation of relatively small fractions of phosphorus poor in arsenic, which is disadvantageous.

It is also known that very pure phosphorus can be produced by zone melting. However, this is a process which enables the production of no more than very small quantities of purified phosphorus, whose price admits using it for quite specific purposes only.

It has now unexpectedly been found that elemental yellow phosphorus can be substantially freed from organic contaminants and/or arsenic by treating it with sulfuryl chloride. It has already been reported in literature that, unlike red phosphorus, white phosphorus reacts only scarcely with sulfuryl chloride even at boiling temperature, while elemental gray arsenic is open to strong attack even at ambient temperature with the resultant formation of $AsCl_3$ and $SO_2$. The arsenic contained in the phosphorus certainly is not present in its gray modification. Presumably, it is incorporated in the tetrahedral phosphorus molecule. For this reason, it is clear that the phosphorus could not be expected to be freed by the sulfuryl chloride treatment from arsenic, which is isolated as arsenic trichloride, bearing in mind that the phosphorus contains the arsenic in a concentration as low as 60 to 65 parts per million (ppm). The particular advantage offered by this reaction, which takes the course shown in the following equation:

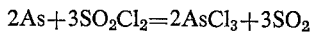

$$2As + 3SO_2Cl_2 = 2AsCl_3 + 3SO_2$$

resides in the exclusive formation of volatile reaction products, which are relatively easy to isolate.

The present process comprises more particularly treating the phosphorus with sulfuryl chloride with thorough mixing, at temperatures between the phosphorus fusion point and 150° C., preferably between 70 and 100° C. This is preferably done by passing gaseous and finely divided sulfuryl chloride through liquid phosphorus. The sulfuryl chloride can be cycled. Its reaction products with the contaminants and the phosphorus, which are found to accumulate in the sulfuryl chloride, can be isolated continuously by distillation, whereas the sulfuryl chloride's reaction products contained in the phosphorus are removed therefrom by extraction, which is preferably carried out with the use of an excess of sulfuryl chloride. Naturally, it is also possible to remove these reaction products from the phosphorus by distillative treatment, preferably in a sulfuryl chloride stream. Given that gaseous sulfuryl chloride is passed through liquid phosphorus, it is advantageous to use the sulfuryl chloride and the phosphorus at a temperature which ensures partial condensation of the sulfuryl chloride while passing through the phosphorus.

The elemental yellow phosphorus produced by the process of the present invention is substantially more light-colored than the feed phosphorus and is even white given that liquid $SO_2Cl_2$ is used. A further advantage of the present invention resides in the fact that the phosphorus is freed simultaneously from organic contaminants so undesirable for one use or other.

Minor proportions of $PCl_3$, which may be found to have been dissolved in the phosphorus after completion of the reaction, can be hydrolyzed later by washing with hot water, the purified phosphorus containing inorganic contaminants in a total proportion of less than 0.01% by weight.

EXAMPLE 1

80 milliliters $SO_2Cl_2$ were slowly added at 65° C. to 200 grams yellow phosphorus, the temperature was increased to 80° C., and the components were thoroughly mixed for 60 minutes in an apparatus having an associated reflux condenser, by the introduction of nitrogen. The reaction mixture was found to separate into two layers. Clear phosphorus was removed from the apparatus base portion. It solidified into a white mass. Supernatant sulfuryl chloride was found to have a deep black coloration and to contain 70% of the arsenic initially contained in the feed phosphorus.

Analysis

Feed phosphorus: 66.5 p.p.m. As; organic material=0.20 weight percent
Purified phosphorus: 19.7 p.p.m. As; organic material=<0.02 weight percent.

EXAMPLE 2

Gaseous and finely divided $SO_2Cl_2$ was cycled at 90° C. through 200 grams liquid yellow phosphorus. The $SO_2Cl_2$ throughput was found to be 350 grams during a test period of 2 hours. The resulting phosphorus, which was initially turbid, became clear after a short period of time and substantially more light-colored. Above the phosphorus, there did form small quantities of an oily black-colored liquid which was easy to separate.

Analysis

Feed phosphorus: 63.2 p.p.m. As; organic material=0.25 weight percent
Purified phosphorus: 8.2 p.p.m. As; organic material=<0.02 weight percent.

EXAMPLE 3

200 grams yellow phosphorus were covered with a layer of 50 milliliters $SO_2Cl_2$ and 190 grams gaseous $SO_2Cl_2$ were cycled for 60 minutes through the reaction mixture. A temperature of about 75° C. was established so as to produce partial $SO_2Cl_2$-condensation and so as to maintain the quantity of liquid $SO_2Cl_2$ approximately constant in the reactor.

Analysis

Feed phosphorus: 65 p.p.m. As; organic material=0.20 weight percent
Purified phosphorus: 16 p.p.m. As; organic material=<0.02 weight percent.

We claim:

1. A process for removing from yellow phosphorus contaminants of the group consisting of arsenic and organic contaminants which comprises thoroughly mixing sulfuryl chloride with yellow phosphorus in a temperature range of between the fusion point of phosphorus and 150° C. to intimately contact the sulfuryl chloride and the phosphorus, after the mixing and intimate contacting forming two liquid layers of the mixture, and then separating the two layers, the upper layer of said layers comprising sulfuryl chloride containing contaminants selected from the group consisting of arsenic and organic contaminants and reaction product of sulfuryl chloride with said contaminants and the lower layer of said layers comprising purified phosphorus.

2. The process of claim 1 comprising carrying out the sulfuryl chloride treatment at temperatures between 70° C. and 100° C.

3. The process of claim 1, wherein the sulfuryl chloride is passed in form of small gas bubbles through liquid phosphorus.

4. The process of claim 1, wherein the sulfuryl chloride is cycled and its reaction product with the contaminants and the phosphorus accumulating in the sulfuryl chloride is continuously isolated therefrom by distillation.

5. The process of claim 1, wherein the reaction products, which are obtained by reaction of the sulfuryl chloride with the contaminants of the phosphorus and contained in the phosphorus, are removed therefrom by extraction with an excess of liquid sulfuryl chloride.

6. The process of claim 1, wherein the reaction products, which are obtained by reaction of the sulfuryl chloride with the contaminants or the phosphorus and contained in the phosphorus, are removed therefrom by distillation.

7. The process of claim 6 comprising carrying out the distillation in a sulfuryl chloride stream.

8. The process of claim 3, wherein gaseous sulfuryl chloride is passed through the liquid phosphorus, the sulfuryl chloride and the phosphorus being used at temperatures of about 75° C. to ensure partial condensation of the sulfuryl chloride passing through the phosphorus.

References Cited

FOREIGN PATENTS

| 156,536 | 1963 | U.S.S.R. | 23—223 |
| 981,420 | 1/1965 | Great Britain | 23—223 |

OTHER REFERENCES

Danneel et al.: Chemical Abstracts, vol. 27, p. 4185 (1933).

OSCAR R. VERTIZ, Primary Examiner

C. B. RODMAN, Assistant Examiner